March 27, 1951 F. C. JOHNSON 2,546,306
CUTTING TOOL HOLDER
Filed Oct. 30, 1946 3 Sheets-Sheet 1

Inventor:
Ferdinand C. Johnson
By Greek Wells
Attorney

March 27, 1951  F. C. JOHNSON  2,546,306
CUTTING TOOL HOLDER
Filed Oct. 30, 1946  3 Sheets-Sheet 2

Inventor:
Ferdinand C. Johnson
By Green Wells
Attorney

March 27, 1951 F. C. JOHNSON 2,546,306
CUTTING TOOL HOLDER
Filed Oct. 30, 1946 3 Sheets-Sheet 3

Inventor:
Ferdinand C. Johnson
By Greek Wells
Attorney

Patented Mar. 27, 1951

2,546,306

UNITED STATES PATENT OFFICE 2,546,306

CUTTING TOOL HOLDER

Ferdinand Clifford Johnson, Milwaukee, Wis., assignor to Kendall Corporation, Milwaukee, Wis., a corporation of Wisconsin Application October 30, 1946, Serial No. 706,749

5 Claims. (Cl. 29—105)

The present invention relates to the mounting of cutting tools and is particularly concerned with a tool mounting for fly cutter discs. In such devices the necessity for having the cutting tools mounted solidly is very great, because of the fact that the fly cutter travels at a high rate of speed and the cutting tools receive severe shocks in engaging the material.

It is the principal purpose of my invention to provide a novel cutting tool mounting whereby the cutting tool is firmly secured in any desired angular position with respect to the mounting disc or wheel, and in which the angular position of the cutting tools carried by the wheel can be preset and maintained even though it is necessary to change the tools or sharpen them a number of times.

It is also a purpose of my invention to provide an improved holding means for securing the cutting tools, which holding means insures solid mounting of the cutting tools in order that they will resist the shock and maintain their position without difficulty.

The nature and advantages of my invention will appear more fully from the following description and accompanying drawings wherein a preferred form of the invention is shown. It should be understood, however, that the drawings and description are illustrative only and are not to be taken as limiting the invention except insofar as it is limited by the claims.

Figure 1:
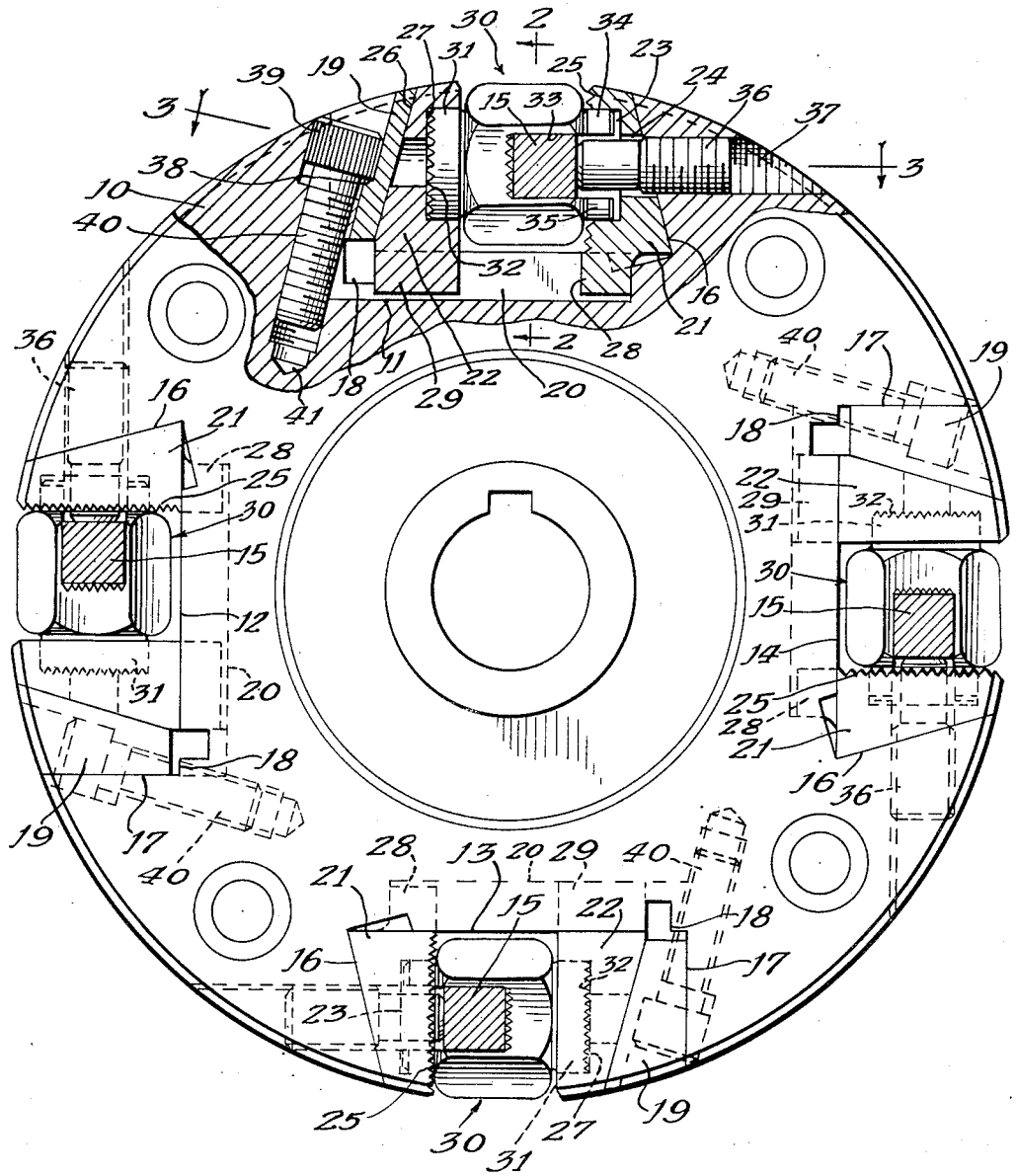
Figure 1 is a view in side elevation of a fly cutter disc to which my invention is applied, certain parts being broken away to illustrate the interior construction.
Figure 2:
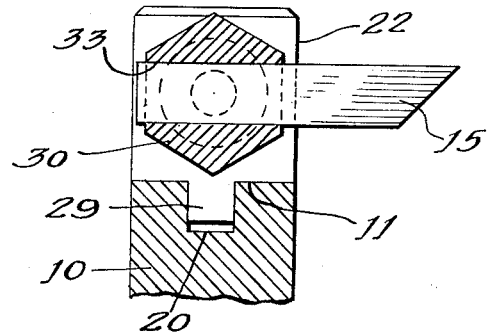
Figure 2 is a fragmentary sectional view taken on the line 2—2 of Figure 1.
Figure 3:
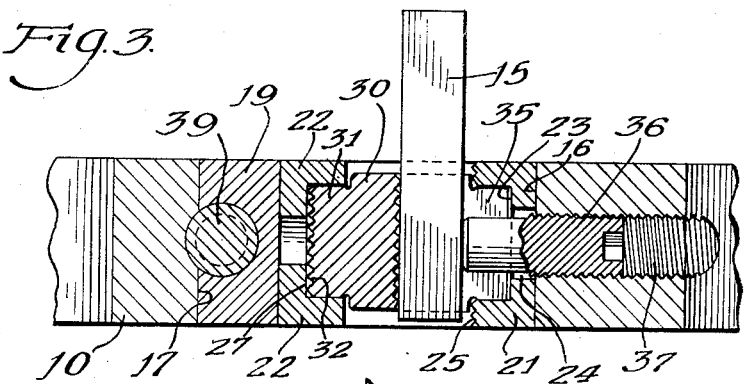
Figure 3 is a fragmentary sectional view taken on the line 3—3 of Figure 1.
Figure 4:
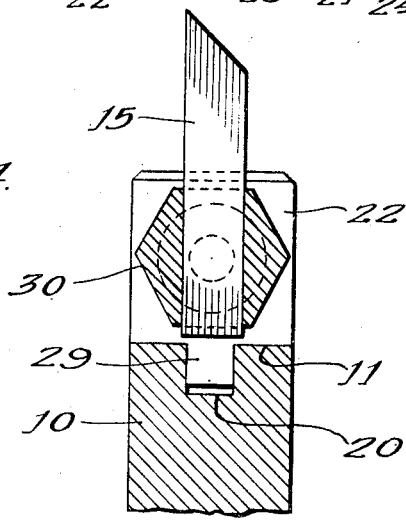
Figure 4 is a sectional view like Figure 2 but showing the cutting tool set at a different angle so as to extend radially outward from the disc.
Figure 5:
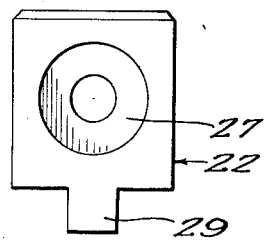
Figure 5 is a detailed view illustrating one of the spacers.
Figure 6:
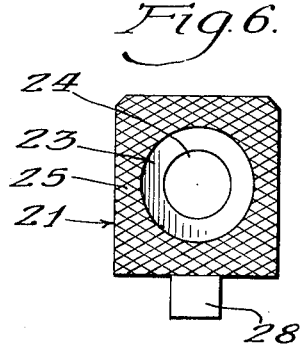
Figure 6 is a detailed view like Figure 5 illustrating the other spacer.
Figure 7:
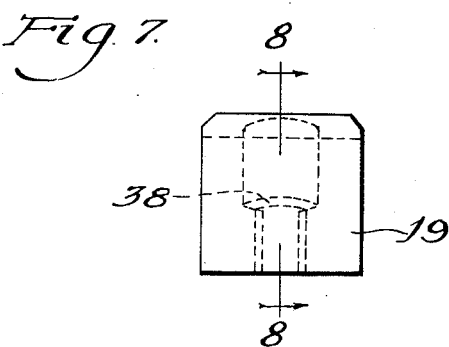
Figure 7 is a detailed view of the wedge.
Figure 8:
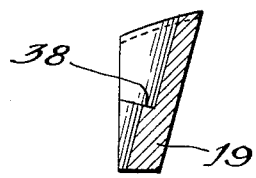
Figure 8 is a sectional view taken on the line 8—8 of Figure 7.
Figure 9:
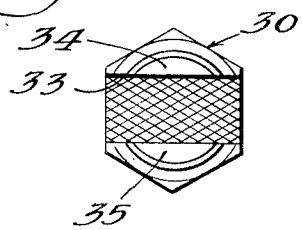
Figure 9 is an end view looking at the right hand end of the tool holder as it is shown in Figure 1.
Figure 10:
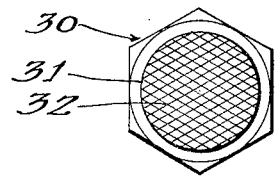
Figure 10 is an end view looking at the left hand end of the tool holder.

Referring now to the drawings and particularly to Figure 1, my invention is shown as applied to a fly cutter disc 10 which is cut away at four places throughout its circumference at 11, 12, 13 and 14 in order to mount four cutting tools 15. Since the several cutting tools have like shanks and may be varied in a great many cases as to their cutting edges, they have not been shown in detail. Each of the recesses 11, 12, 13 and 14 has its opposite faces 16 and 17 arranged at different angles with respect to a radius of the disc 10. At the bottom of the recess adjacent the face 17 there is an offset at 18 which is adapted to receive a pin for driving out a securing wedge 19. The bottom of the recess also has a longitudinally running channel 20.

Two spacers 21 and 22 are provided. The spacer 21 has its outer face machined to match the face 16 of the cutter disc and on its inner face it is provided with an annular recess 23. An aperture 24 extends through this spacer for a purpose which will presently appear. Around the recess 23 the spacer 21 has a knurled hardened surface 25. Adjacent the wedge 19 the spacer 22 has a machined and hardened surface 26 to engage the wedge. The opposite face of the spacer has an annular recess 27 for receiving the tool bit holder which is indicated generally by the numeral 30. The spacers 21 and 22 have ribs 28 and 29 respectively which extend down into the channel 20.

The holder 30 has a cylindrical projection 31 extending into the recess 27 the end face of the projection being knurled as indicated at 32. The holder is slotted at 33 to receive the shank of a tool 15 and the bottom of the slot 33 is knurled in the same manner as the face of the cylindrical portion 31. Two cylindrical segments 34 and 35 at the opposite end of the holder 30 extend into the recess 23 but do not engage the bottom of the recess. The intermediate portion of the holder 30 is formed with plane faces arranged 60° apart so as to form a hexagon nut surface by which the holder 30 can be rotated using a standard hexagon wrench.

The shank of the tool bit 15 is clamped in place in the slot 33 by a set screw 36 which threads into a threaded aperture 37 of the disc 10. The wedge 19 is recessed to provide a seat 38 for the head 39 of a screw 40 which is threaded in a hole 41 formed in the disc 10. By threading the screw 40 in the hole 41 the wedge 19 is drawn down to force the spacers 21 and 22 to clamp the holder 30 in place. When the screw 40 is loosened the holder can be turned to position the tool at the proper angle with respect to the disc. Actually this angle of adjustment of a tool is nearly 270° which enables the cutter to be used for a great variety of work. When the proper angles of the tools have been set and the holders 30 are clamped in place the tools 15 can be inserted and replaced without disturbing the angle merely by loosening the screws 36.

It is believed that the nature and advantages of my invention will be clear from the foregoing description. The tools 15 can be preset in various patterns to make different cuts. Once the pattern is set the tools can be removed and inserted again without disturbing the angle of the tool with respect to the plane of the disc. In all positions the guiding and wedging surfaces hold the tool holder firmly.

Having thus described my invention, I claim:

1. A tool support for cutting tools and the like comprising a mounting member, having a cross channel cut therein, the sides of said channel tapering toward each other from the bottom of the channel outwardly, a pair of spacers seated in said channel and having opposed faces spaced apart, said faces being recessed, a wedge interposed between one of said spacers and the adjacent side of the channel, means to draw said wedge toward the bottom of the channel to urge said spacers toward each other, a tool holder having end portions rotatably received in the recesses of said spacers, said holder having a tool receiving slot extending transversely across it opening toward the spacer most remote from the wedge, and means extending through the last named spacer and threaded in the mounting member for clamping a tool in said holder.

2. A tool support for cutting tools and the like comprising a mounting member, having a cross channel cut therein, the sides of said channel tapering toward each other from the bottom of the channel outwardly, a pair of spacers seated in said channel and having opposed faces spaced apart, said faces being recessed, a wedge interposed between one of said spacers and the adjacent side of the channel, means to draw said wedge toward the bottom of the channel to urge said spacers toward each other, a tool holder having end portions rotatably received in the recesses of said spacers, said holder having a tool receiving slot extending transversely across it opening toward the spacer most remote from the wedge, and means extending through the last named spacer and threaded in the mounting member for clamping a tool in said holder, said channel having a bottom channel extending from one tapered side toward the other and said spacers having reduced ribs slidably seated in said bottom channel.

3. A tool support for cutting tools and the like comprising a mounting member, having a cross channel cut therein, the sides of said channel tapering toward each other from the bottom of the channel outwardly, a pair of spacers seated in said channel and having opposed faces spaced apart, said faces having cylindrical recesses therein facing each other, a wedge interposed between one of said spacers and the adjacent side of the channel, means to draw said wedge toward the bottom of the channel to urge said spacers toward each other, comprising a headed screw threaded into the mounting member, said wedge having a shoulder engaging the screw head, a tool holder having end portions rotatably received in the recesses of said spacers, said holder having a tool receiving slot extending transversely across it opening toward the spacer most remote from the wedge, and means extending through the last named spacer and threaded in the mounting member for clamping a tool in said holder.

4. A tool support for cutting tools and the like comprising a mounting member, having a cross channel cut therein, the sides of said channel tapering toward each other from the bottom of the channel outwardly, a pair of spacers seated in said channel and having opposed faces spaced apart, said faces having cylindrical recesses therein facing each other, a wedge interposed between one of said spacers and the adjacent side of the channel, means to draw said wedge toward the bottom of the channel to urge said spacers toward each other, a tool holder having end portions rotatably received in the recesses of said spacers, said holder having a tool receiving slot extending transversely across it opening toward the spacer most remote from the wedge, and means extending through the last named spacer and threaded in the mounting member for clamping a tool in said holder, said end portion received in the spacer adjacent to the wedge being roughened on its end face and engaging the bottom of the recess in the spacer.

5. A tool support for cutting tools and the like comprising a mounting member having a cross channel cut therein at its periphery, said member having a second channel in the bottom of said first named channel, a spacer having a rib in said second channel and having a surface thereon facing one side wall of the channel tapered to recede from said side wall toward the periphery of the mounting member, a wedge interposed between the said surface and side wall, a screw threaded into the mounting member and having a head rotatably seated on said wedge, a tool holder in said cross channel, said holder having a transverse slot for a cutting tool, means at the other side wall providing a pivotal axis about which said holder can turn, and means cooperating with the spacer to releasably clamp the tool in said slot.

FERDINAND CLIFFORD JOHNSON.

REFERENCES CITED

The following references are of record in the file of this patent:

UNITED STATES PATENTS

| Number | Name | Date |
|---|---|---|
| 864,420 | Haber | Aug. 27, 1907 |
| 1,039,054 | Hartzall | Sept. 17, 1912 |

FOREIGN PATENTS

| Number | Country | Date |
|---|---|---|
| 393,669 | Great Britain | June 15, 1933 |